United States Patent [19]

Wang

[11] Patent Number: 4,890,252

[45] Date of Patent: Dec. 26, 1989

[54] LONG PERIOD PSEUDO RANDOM NUMBER SEQUENCE GENERATOR

[75] Inventor: Charles C. Wang, Arcadia, Calif.

[73] Assignee: The United States of America as represented by the Administrator of the National Aeronautics and Space Administration, Washington, D.C.

[21] Appl. No.: 113,954

[22] Filed: Oct. 29, 1987

[51] Int. Cl.$^4$ ................................................ G06F 1/02
[52] U.S. Cl. .................................... 364/717; 364/746.1
[58] Field of Search .................... 364/717, 746.1, 754

[56] References Cited

U.S. PATENT DOCUMENTS 3,614,400 10/1971 Farnett et al. ...................... 364/717
4,251,875 2/1981 Marver et al. .................... 364/746.1
4,587,627 5/1986 Omura et al. ...................... 364/754

OTHER PUBLICATIONS

Wang et al, "VLSI Architectures for Computing Multiplications and Inverses in GF($2^m$)", IEEE Trans. on Comp., vol. C-34, No. 8, Aug. 1985, pp. 709–717.

Primary Examiner—E. S. Kemeny
Assistant Examiner—Tan V. Mai
Attorney, Agent, or Firm—Thomas H. Jones; John R. Manning; Charles E. B. Glenn

[57] ABSTRACT

A circuit for generating a sequence of pseudo random numbers, $\{A_k\}$. There is an exponentiator (30') in GF($2^m$) for the normal basis representation of elements in a finite field GF($2^m$) each represented by m binary digits and having two inputs and an output from which the sequence $\{A_k\}$ of pseudo random numbers is taken. One of the two inputs is connected to receive the outputs $\{E_k\}$ of maximal length shift register of n stages. There is a switch (32) having a pair of inputs and an output. The switch (32) output is connected to the other of the two inputs of the exponentiator (30'). One of the switch (32) inputs is connected for initially receiving a primitive element $A_0$ in GF($2^m$). Finally, there is a delay circuit (34) having an input and an output. The delay circuit (34) output is connected to the other of the switch (32) inputs and the delay circuit (34) input is connected to the output of the exponentiator (30') whereby after the exponentiator (30') initially receives the primitive element $A_0$ in GF($2^m$) through the switch (32), the switch (32) can be switched to cause the exponentiator (30') to receive as its input a delayed output $A_{k-1}$ from the exponentiator (30') thereby generating $\{A_k\}$ continuously at the output of the exponentiator (30'). The exponentiator (30') in GF($2^m$) is novel and comprises a cyclic-shift circuit; a Massey-Omura multiplier; and, a control logic circuit all operably connected together to perform the function $U_i = {_\alpha}2^i$ (for $n_i = 1$) or 1 (for $n_i = 0$).

5 Claims, 4 Drawing Sheets

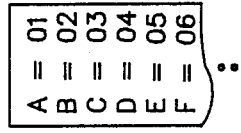
@&#% → FACE
*FIG. 2*
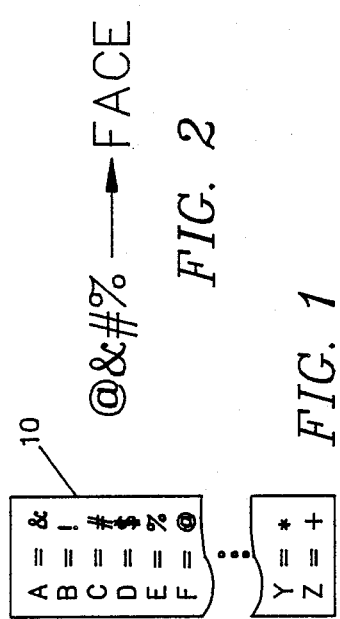
06010305 → FACE
*FIG. 4*
*FIG. 3*
*FIG. 1*
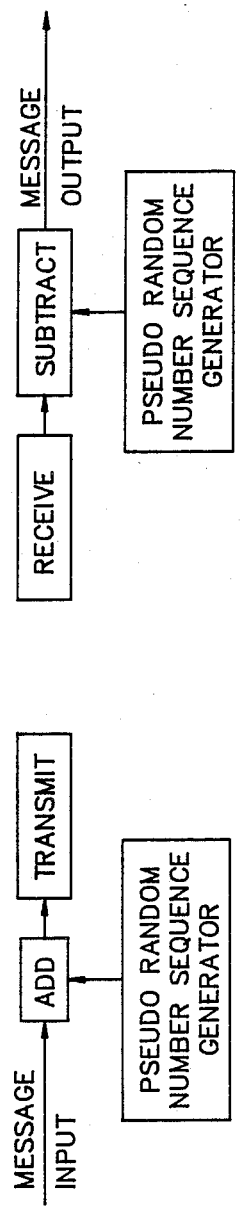
*FIG. 5* PRIOR ART
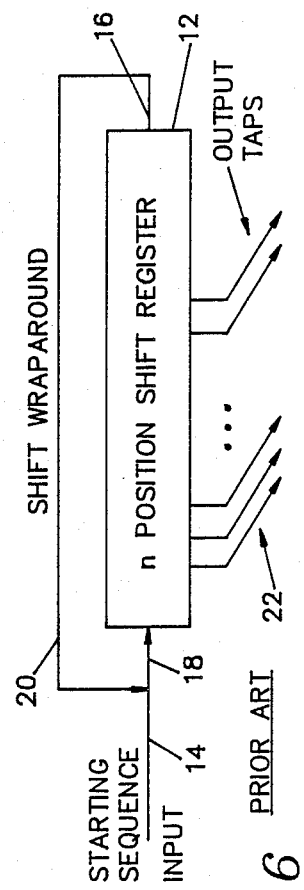
*FIG. 6* PRIOR ART

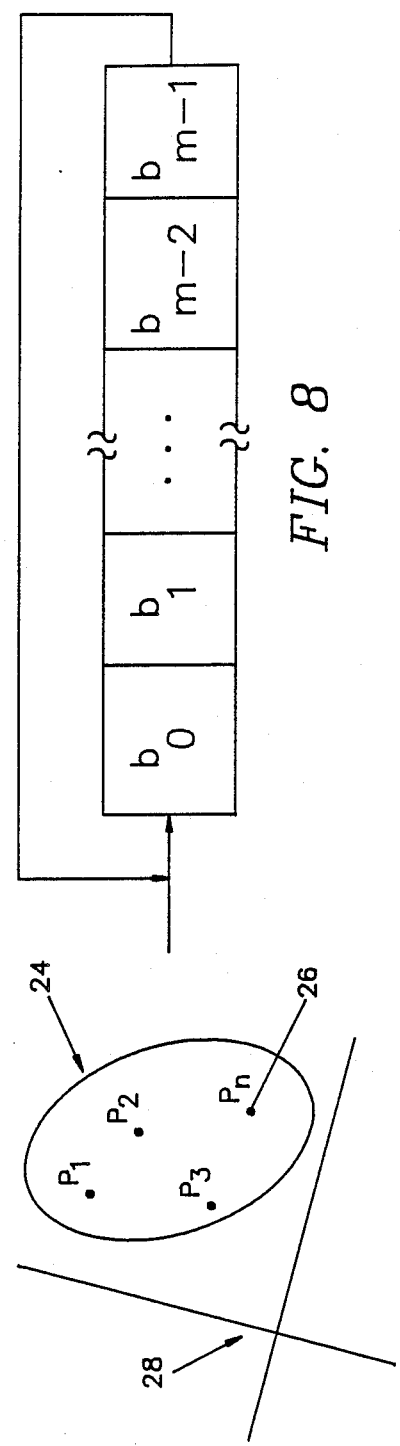
FIG. 8
FIG. 7
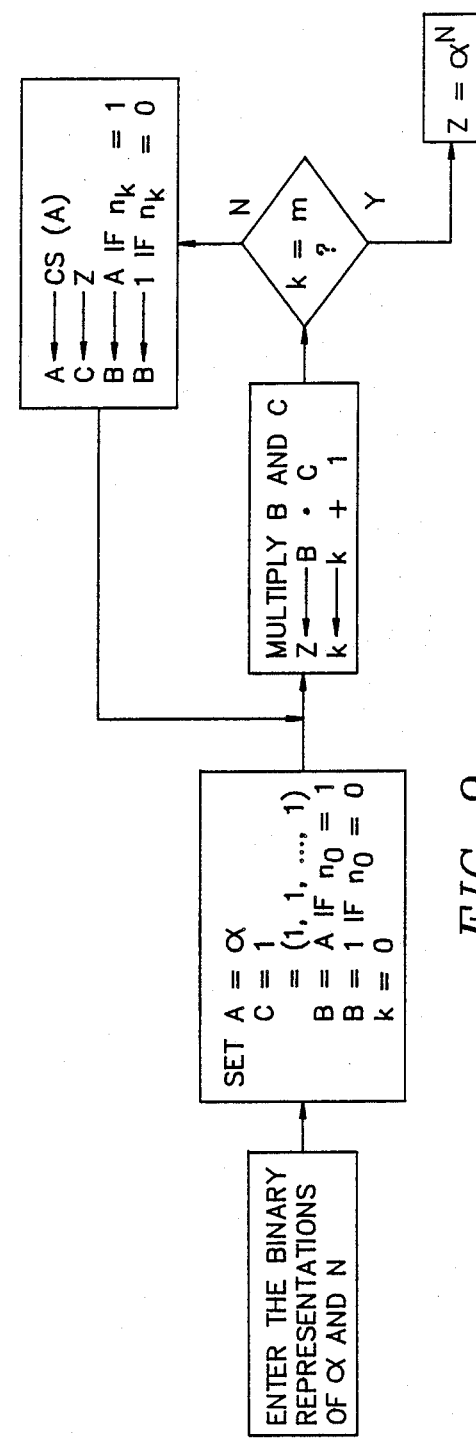
FIG. 9

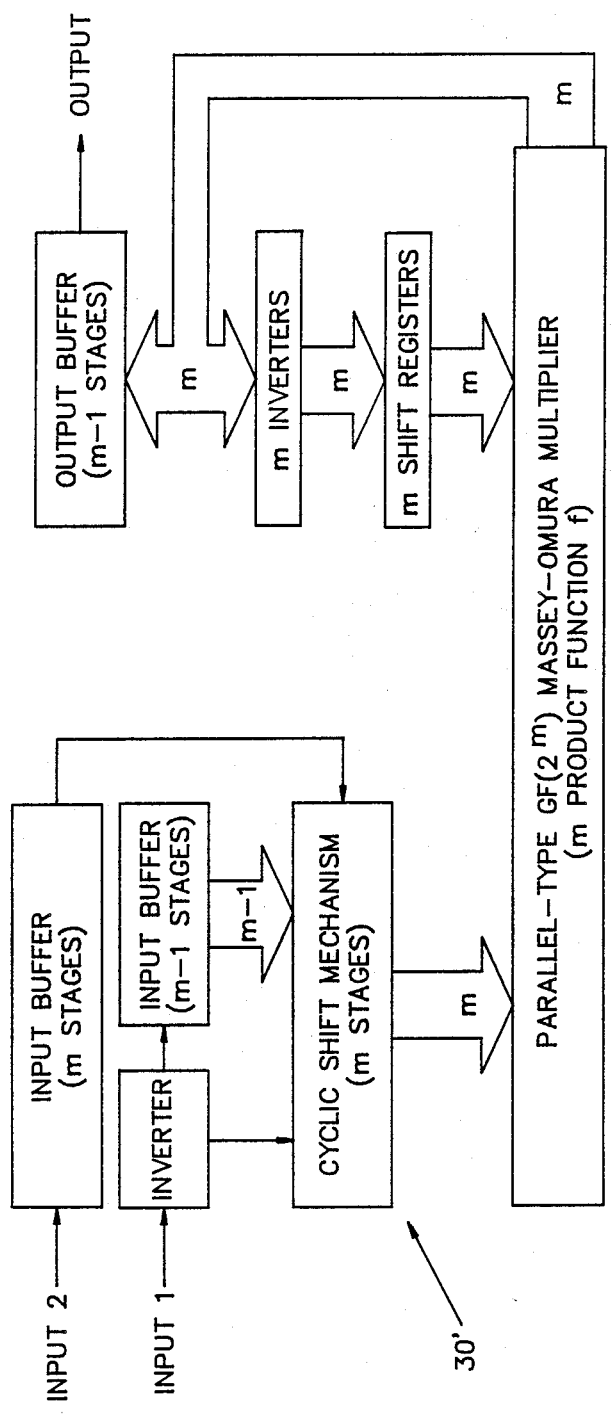
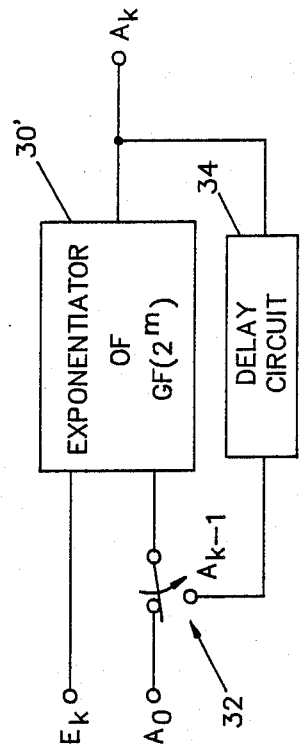
FIG. 11
FIG. 12

LONG PERIOD PSEUDO RANDOM NUMBER SEQUENCE GENERATOR

ORIGIN OF THE INVENTION

The invention described herein was made in the performance of work under a NASA contract and is subject to the provisions of Public Law 96-517 (35 USC 202) in which the Contractor has elected not to retain title. 1. Technical Field The present invention relates to cryptography and, more particularly, to a circuit for generating a sequence of pseudo random numbers, $\{A_k\}$, having a long period comprising, an exponentiator in $GF(2^m)$ for the normal basis representation of elements in a finite field $GF(2^m)$ each represented by m binary digits and having two inputs and an output from which the sequence $\{A_k\}$ of pseudo random numbers is taken, one of the two inputs being connected to receive the outputs $\{E_k\}$ of a maximal length shift register of n stages; a switch having a pair of inputs and an output, the switch output being connected to the other of the two inputs of the exponentiator, one of the switch inputs being connected for initially receiving a primitive element $A_0$ in $GF(2^m)$; and, a delay circuit having an input and an output, the delay circuit output being connected to the other of the switch inputs, the delay circuit input being connected to the output of the exponentiator whereby after the exponentiator initially receives the primitive element $A_0$ in $GF(2^m)$ through the switch the switch can be switched to cause the exponentiator to thereafter receive as its input a delayed output $A_{k-1}$ from the exponentiator thereby generating $\{A_k\}$ continuously at the output of the exponentiator.

In the preferred embodiment, the exponentiator in $GF(2^m)$ comprises, a cyclic-shift circuit; a Massey-Omura multiplier; and, a control logic circuit all operably connected together to perform the function $U_i = \alpha 2^i$ (for $n_i = 1$) or 1 (for $n_i = 0$).

2. Prior Art and Technical References

The following provide further information on the subject matter of the present invention and/or techniques and apparatus incorporated therein.

1. J. L. Massey and J. K. Omura, Patent Application on "Computational Method and Apparatus for Fine Field Arithmetic", now U.S. Letters Pat. No. 4,587,627.
2. C. C. Wang, et al., "VLSI Architectures for Computing Multiplications and Inverses in $GF(2^m)$", IEEE Transactions on Computers, Vol. C-34, No. 8, August 1985.
3. R. C. Dixon, *Spread Spectrum Systems*, John Wiley & Sons, Inc., 1932.
4. F. J. MacWilliams and N. J. A. Sloane, *The Theory of Error-Correcting Codes*, North-Holland Publishing, New York, 1977.
5. M. Perlman, "Periodic Binary Sequence Generators: Very Large Scale Integrated (VLSI) Circuits Considerations", Jet Propulsion Laboratory (JPL) Publications 85-7, December, 1984.

DESCRIPTION OF THE PRIOR ART

The field of cryptography has undergone a step increase in its requirements for producing "unbreakable" code since the inception of the digital computer. When coded messages only existed and were transmitted in analog form (i.e. the written "word") as represented by FIGS. 1 and 2, the production of a code which was difficult to break was fairly easy and the breaking of the code of others was a laborious and time-consuming task as the work had to be done by human mental labor. For example, one could make a code table 10 as shown in FIG. 1 wherein a symbol is substituted for each letter of the normal alphabet, e.g., A becomes &. Messages written with the substituted alphabet are easily deciphered only with the help of a corresponding code table 10 in the hands of the receiver. Thus, only with a code table 10 can the receiver of the message "@&#%" understand it to be the word "FACE" as shown in FIG. 2. To break the code, one must use trial and error substitutions trying to find substitutions which make sense. Certain knowledge about common combinations make the process easier; but, it is still laborious at best.

With the advent of the digital computer with the ability to perform masses of combinations and permutations of trial and error data in a matter of seconds, mere substitution codes become relatively worthless. Additionally, the electronic transmission of data added to the problem. While the written analog cryptographer could devise his own symbols for substitution, the electronic cryptographer is faced with the use of "standard" binary electronic substitutions for the alphabetic (and associated) characters. Even the original Morse code employed with telegraph transmissions is a form of a binary code with fixed substitutions. For example, a "dash" can be thought of as a binary "1" while a "dot" is a binary "0". Thus, the letter G (i.e. Morse code dash, dash, dot) can be thought of as binary 110. Most digital devices associated with computers employ fixed numerical representations (such as so-called "ASCII") for the characters as input, transmitted, and printed. Thus, as represented by the drawing of FIGS. 3 and 4, the letter "A", for example, is represented by the number "01" (i.e. the eight bit binary byte 00000001) and the message "FACE" of FIG. 2 becomes "06010305" (in binary bytes) when transmitted within a binary system.

Faced with this problem, cryptographers (where the term "cryptographer" includes persons who develop methods for securing data a programs within the digital computers themselves) found that an effective method of encrypting data, programs, and messages was to add a pseudo random number sequence thereto on the transmitting end and to subtract the same pseudo random number sequence therefrom on the receiving end as shown in FIG. 5. Since there is no constant substitution factor, the trial and error method of code breaking is ineffective, even at computer speeds.

The generation of a periodic sequence of pseudo random numbers finds use in a number of applications such as spread spectrum communications and cryptographic systems as well as in other signal processing applications such as noise generation, ranging code generation, and test data sequence generation. The pseudo random number sequence addition/subtraction technique has been applied to varying levels of security requirements from the simple prevention of unauthorized disclosure of valuable coding within otherwise accessible computer programs and data to the incryption of data highly sensitive to the national security. The differentiating factor, in each case, being the complexity of the generator for the pseudo random number sequence. The shorter the period of the sequence (i.e. the number of pseudo random numbers in the sequence before the sequence begins to repeat), the less costly the generator and the more regular (i.e. less random) resultant sequence. As can be appreciated in this regard when considered in the ridiculous extreme, a pseudo random sequence of 02, 05, 03, 02, 05, 03, . . . would approach the adding of a constant to any data and would be fairly easily recognized whereas a sequence with an infinite period (e.g. which never repeated) would be virtually impossible to recognize.

The typical prior art approach to the generation of a pseudo random number sequence is shown in simplified form in FIG. 6. A modular multiple-tap sequence generator as developed is described in reference 3 and has been considered in the art as a very powerful and simple pseudo random number generator. A VLSI circuit for that generator has also been developed and is reported in reference 5. In general, there is a n-position shift register 12. An initial value is loaded into the register 12 over the input line 14. The value is then shifted through the register 12 by one position for each pseudo random number to be generated. The register 12 is a wrap-around register in that the bit being shifted out at the output end 16 is shifted into the input end 18 via the feedback or wraparound line 20. The pseudo random number sequence is taken out from a number of taps 22 into the register 12 since the number of positions "n" of the register 12 is typically much larger than the number of bits in each "number" of the sequence.

The period of the pseudo random number sequence produced by the prior art apparatus of FIG. 6 is determined by the number of positions "n" of the register 12. Since an initialization value of "zero" is never employed (for obvious reasons), the period is equal to the quantity $2^n-1$ and is known as the "maximal length" achievable by this approach. By way of example, the period of a 17-stage maximal length shift register operating in the prior art manner of FIG. 6 is 131,071. To get a larger period, more positions must be added to the register 12—and the increase is not substantial. For example, the period of a 19-stage maximal length shift register is only 449,113. This may seem substantial; however, it is small in circumstances of extreme criticality where an infinite period would be more desirable and beneficial.

DISCLOSURE OF THE INVENTION

This invention is primarily directed at a method and apparatus for generating a random number sequence whose period is longer than $2^n-1$ when n shift registers are used. It incorporates a simple VLSI implementable device to perform exponentiation in $GF(2^m)$ by using a Massey-Omura multiplier and is capable of generating a very long pseudo random sequence when $2^m-1$ is a Mersenne prime. While the sequence generated by the present invention may not have a flat spectrum as does the sequence generated by the prior art maximal length shift register as described earlier herein, the increase of the period is very significant and makes its sequence very desirable in some applications wherein period length is of paramount importance.

DETAILED DESCRIPTION OF THE DRAWINGS

FIG. 1 is a substitution table as used in the prior art for encrypting written messages.

FIG. 2 is an example of an encrypted message using the table of FIG. 1.

FIG. 3 is a table showing how numbers are employed to represent characters in the electronic input, transmission, and printing of characters.

FIG. 4 is an example of the numeric representation of the message of FIG. 2 employing the numeric substitutions of the table of FIG. 3.

FIG. 5 is a block diagram showing a prior art technique employed in the protection and encrypting of data represented numerically wherein a pseudo random number sequence is added to the data for transmission or storage and then subtracted out for use.

FIG. 6 is a block diagram of a prior art maximal length shift register employed for generating pseudo random number sequences.

FIG. 7 is a simplified representation of a finite field containing points identifiable in a co-ordinate system.

FIG. 8 is a simplified diagram of a cyclic-shift circuit for achieving $_\alpha 2^i$ by operating on the normal basis representation of $_\alpha 2^{i-1}$.

FIG. 9 is a flow chart of the method of the present invention for realizing the exponentiation in $GF(2^m)$ by using a cyclic-shift circuit, a Massey-Omura multiplier, and a control logic circuit performing the function $U_i = _\alpha 2^i$ (for $n_i=1$) or 1 (for $n_i=0$).

FIG. 11 is a block diagram of the system structure of the circuitry of FIG. 10 for a general field $GF(2^m)$.

FIG. 12 is a block diagram of a mechanism according to the present invention which can generate pseudo random numbers, $A_k$.

DETAILED DESCRIPTION OF THE INVENTION

Figure 10:
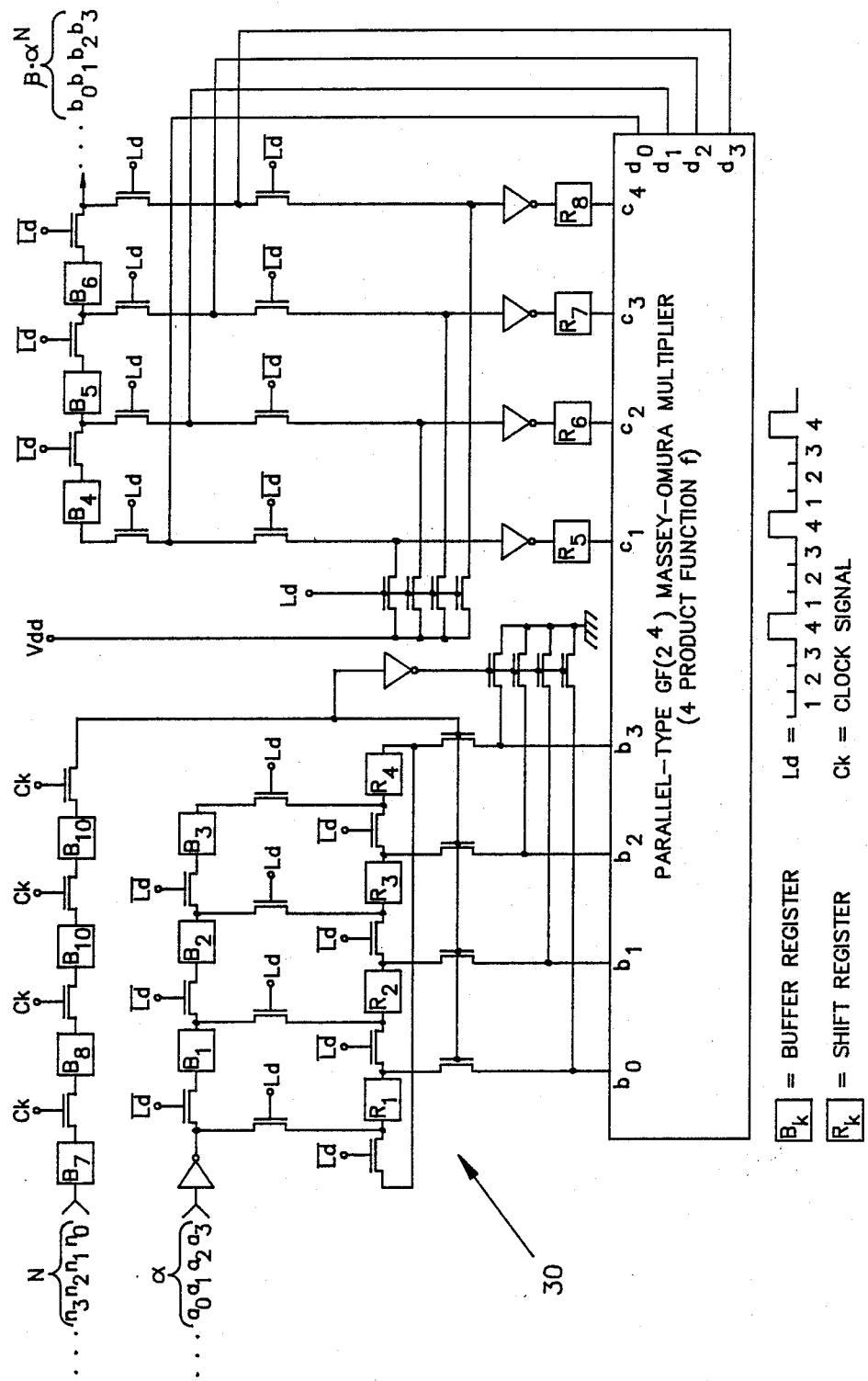
FIG. 10 is a VLSI implementable circuit according to the present invention for performing the recursive algorithm for computing exponentiation in $GF(2^4)$.

With reference to FIG. 7 as a starting point, assume that there is a field 24 containing a number of points 26 designated as $P_1, P_2, \ldots P_n$. The field and the points therein can be described with respect to any of a number of co-ordinate systems such as that indicated as 28. One such representation system well known in the prior art is the "normal basis" system.

Recently, Massey and Omura [as described in reference 1] invented a new algorithm to multiply in the finite field $GF(2^m)$. In their invention, they utilize a normal basis of the form $a, a^2, a^4, \ldots, _a 2^{m}-1$ to represent elements of the field. Employing a normal basis representation, each element in the finite field $GF(2^m)$ can be represented by m binary digits. Also, in employing a normal basis representation, squaring of an element in $GF(2^m)$ is readily shown to be a simple cyclic shift of its binary digits [as described in references 1 and 2]. Also, multiplication requires the same logic circuitry for any one digit of the product as it does for any other [as also described in references 1 and 2]. Adjacent product digit circuits differ only in their inputs, which are cyclically shifted versions of one another. In reference 2, the inventor herein and others presented a VLSI architecture to implement this Massey-Omura multiplier in $GF(2^m)$. Both sequential-type and parallel-type Massey-Omura multipliers have been illustrated. They are shown to be simple and regular. A VLSI architecture for computing inverses in $GF(2^m)$ was also developed in reference 2 by using a parallel-type Massey-Omura multiplier.

Exponentiation in the finite field $GF(2^m)$ is necessary in the implementation of some error-correcting coders, such as Reed-Soloman codes. The conventional method for computing exponents in a finite field uses a lookup table. This method cannot be realized efficiently in a VLSI circuit. As will be described herein shortly, the inventor herein has devised a recursive pipeline exponentiation circuit using a Massey-Omura multiplier. The architecture of that circuit is similar to that of the inversion circuit mentioned above, is regular and expandable, and, hence, naturally suitable for VLSI implementation.

For an arbitrary $\alpha$ in the finite field $GF(2^m)$ and an integer N, (where $1 \leq N \leq 2^m - 1$), and $\alpha = \beta^N$, clearly, $\beta$ is in $GF(2^m)$. When N is represented in binary form as $(n_0, n_1, n_2, \ldots n_{m-1})_I$, it can be proved mathematically (proof omitted in the interest of simplicity and the avoidance of redundancy) that exponentiation in the finite field $GF(2^m)$ can be accomplished by successive multiplication. From the teachings of references 1 and 2 it is known that, in normal basis, $\alpha^{2^i}$ can be achieved by a cyclic-shift circuit as shown in FIG. 8 operating on the normal basis representation of $\alpha^{2^{i-1}}$. The exponentiation in $GF(2^m)$ can, therefore, be realized by using a cyclic-shift circuit, a Massey-Omura multiplier, and a control logic circuit performing the function $U_{i=\alpha^{2^i}}$ (for $n_i = 1$) or 1 (for $n_i = 0$). The algorithm of this structure is shown in FIG. 9 and can be described as follows:

(i) Let $A = \alpha$
  If $n_0 = 1$, let $B = A$
    Otherwise, let $B = 1$
  Let $C = 1$ and $k = 0$
(ii) Multiply B and C to obtain $Z = B C$
  Set $k = k + 1$
(iii) Replace A with the cyclic shift (CS) of A
  If $k = m$, $Z = \alpha^N$, Stop
  If $k < m$, $C = Z$ and $B = A$ if $n_k = 1$,
    Otherwise $B = 1$
(iv) Go back to step (ii)

This recursive algorithm for computing exponentiation in $GF(2^4)$ can be realized by the circuit 30 shown in FIG. 10. In the circuit of FIG. 10, a parallel-type Massey-Omura multiplier of $GF(2^4)$ is utilized. The architecture is somewhat similar to that shown in FIG. 9 of reference 2 as used for computing the inverses in $GF(2^4)$; but, it has an additional input for the exponent N and only one control signal, Ld. By way of illustration of its operation, let the exponent N be represented by $(n_3, n_2, n_1, n_0)_I$ such that N is equal to the sum from $i = 0$ to 4 of $n_i 2^i$, where $n_0 = 0$ or 1. If one follows the progress of the computation, it will be found that at the end of the third clock cycle, the complementary values of $a_1$, $a_2$, and $a_3$ are stored in the input buffer flip-flops $B_1$, $B_2$, and $B_3$, respectively. During the fourth clock cycle, $Ld = 1$. Then the complementary values of $a_0$, $a_1$, $a_2$, and $a_3$ are simultaneously shifted into $R_1$, $R_2$, $R_3$, and $R_4$, respectively. At the same moment, buffer flip-flops $B_7$, $B_8$, $B_9$, and $B_{10}$ are fed with the values of $n_3$, $n_2$, $n_1$, and $n_0$, respectively, and registers $R_5$, $R_6$, $R_7$, and $R_8$ are also fed with the values "0". Notice that, actually, the complementary representation of $\alpha$ and 1 are entering the buffers R for multiplication. This is due to the fact that the "AND" function required in the Massey-Omura multiplier developed in reference 2 is achieved by using an "OR" function operating on the complements of multiplicand and multiplier.

A parallel-type $GF(2^4)$ Massey-Omura multiplier simultaneously yields four product components $d_0$, $d_1$, $d_2$, and $d_3$. Therefore, during the next four clock cycles, while $n_i(i = 0, 1, 2, 3)$ controls the entering of either $\alpha^{2^i}$ or 1 to the multiplier, four successive multiplications are performed for the exponentiation. When the fourth multiplication is completed, $Ld = 1$. Thus, the first digit, $b_3$, of the normal basis representation of $\alpha^N$ is shifted out of the circuit. At the same time, the other three digits, $b_0$, $b_1$, and $b_2$, of are fed into the output buffer flip-flops $B_4$, $B_5$, and $B_6$, respectively. These are sequentially shifted out of the circuitry during the next three clock cycles.

The above-described method of computing exponentiation in $GF(2^4)$ takes four clock cycles. During this four clock cycles, the circuit of FIG. 10 allows the bits of the next element (following $\alpha$) to be fed into it and the bits of the previous element to be shifted out of it, simultaneously. The circuit, therefore, provides a full pipeline capability so that the same operation can be performed continuously. As mentioned earlier, the pipelined exponentiation circuitry for $GF(2^4)$ of FIG. 10 is well-suited for VLSI implementation. The system structure of this circuitry 30' for a general field $GF(2^m)$ is shown in FIG. 11.

The use of exponentiation in a finite field $GF(2^m)$ to simply and easily generate a pseudo random number sequence having a period which is orders of magnitude longer than that possible with the prior art maximal length shift register approach will now be described.

First, if $E_1, E_2, E_3, \ldots$ is a sequence of integers generated by a maximal length shift register of n stages, it is well known that $E_k$ is in the set S  1, 2, 3, $\ldots$, $2^n - 1$; and, that the sequence $E_k$, where $k = 1, 2, 3, \ldots$, is a periodic sequence with period $2^n - 1$. Furthermore, the subsequence of $E_k$ within on period is a permutation of elements in S.

Now, by way of background and introduction, if $A_0$ is a primitive element in $GF(2^m)$, where $m \geq n$ (the "n" specified in the previous paragraph), then, $2^m - 1$ is the smallest positive integer L, the so-called order of $A_0$, such that $A_0^L = 1$. Hence, for any two distinct numbers $E_i$, $E_j$ (i, j $\leq 2^n - 1$) in the sequence $\{E_k\}$, $A_0^{E_i} \neq A_0^{E_j}$. If $A_i = A_0^{E_k}$, then $\{A_k\}$ is a periodic sequence of elements in $GF(2^m)$ with the same period as the sequence $\{E_k\}$, $2^n - 1$. Although $\{A_k\}$ is a collection of elements in $GF(2^m)$, the representation of every $A_k$ in some basis of $GF(2^m)$ presents a binary representation of an integer in $[1, 2^m - 1]$. Therefore, the sequence of $\{A_k\}$ can be regarded as a periodic sequence of positive integers. By generating the sequence $\{A_k\}$ as described above, however, one cannot increase the periodicity of the sequence $\{E_k\}$. The manner in which this approach can be employed to increase the periodicity of the resultant sequence will now be described.

A random number sequence $\{A_k\}$ can be generated by letting $A_k = A_{k-1}^{E_k}$. Putting it differently, $\{A_k\}$ can be expressed as:

$$A_1 = A_0^{E1} \tag{1}$$

$$A_2 = A_1^{E2} = A_0^{E1E2}$$

$$\vdots$$

$$A_j = A_{j-1}^{Ej} = A_0^{E1E2E3\cdots Ej} = A_0^{\prod_{i=1}^{j} Ei \, g \bmod 2m-1}$$

$$\vdots$$

$$A_{2n-1} = A_{2n-2}^{E2^n-1} = A_0^{P}$$

where $P = (2^n - 1)! \bmod (2^m - 1)$.

In the interest of simplicity and the avoidance of redundancy, it will be taken as true that the following can be mathematically proved:

If the sequence $\{A_k\}$ is periodic, $n < m$. (2)

If $A_0$ is a primitive element in $GF(2^m)$ with (3)

$2^m - 1$ a Mersenne prime, then $\{A_k\}$ is a periodic sequence with period of $(2^n - 1)r$ , where $r$ is the smallest positive integer such that $P^r = 1 \bmod (2^m - 1)$.

From (3), the algorithm given in (1) as to using exponentiation in the finite field $GF(2^m)$ with $2^m - 1$ being a Mersenne prime has been proved to be able to generate a pseudo random number sequence with period $(2^n - 1)r$. This period is, in general, much greater than the period of a maximal length sequence for the same n-stage shift register. FIG. 12 shows a mechanism which can generate such pseudo random numbers, $A_k$, in simplified block diagram form. The circuitry consists of an exponentiator 30' in $GF(2^m)$ as developed above herein. One of the two inputs to the exponentiator 30' is the outputs $\{E_k\}$ of a maximal length shift register of n stages (not shown) according to the prior art as described above. The other input is initially fed by a primitive element $A_0$ in $GF(2^m)$ and then switched by means of switch 32 to the delayed output $A_{k-1}$ from the exponentiator 30' through delay circuit 34. It can be seen and appreciated that the pipeline structure of the exponentiator 30 as describe above is necessary in order to generate $A_k$ continuously.

It is worthy of note at this time by way of comparison that with m=19 and n=17 the period of 131,071 of a prior art maximal length shift register of 17 stages is increased by 262,143 times to a period of 3,435,934,513 with the pseudo random number generator according to the present invention as shown in FIG. 12. In fairness, it should be pointed out that the pseudo random number sequence generated by maximal length shift registers has good autocorrelation properties and some other periodicity properties which do not exist for the sequence $\{A_k\}$ described herein as produced by the present invention. For applications in cryptography, for example, these properties are not important and the vast gain in period length more than compensates for the losses in these properties.

Wherefore having thus described the present invention, what is claimed is:

1. A circuit for generating a sequence of pseudo random numbers, $\{A_k\}$, comprising:
   (a) an exponentiator in $GF(2^m)$ for the normal basis representation of elements in a finite field $GF(2^m)$ each represented by m binary digits and having two inputs and an output from which the sequence $\{A_k\}$ of pseudo random numbers is taken, one of said two inputs being connected to receive the outputs $\{E_k\}$ of a maximal length shift register of n stages;
   (b) a switch having a pair of inputs and an output, said output of said switch being connected to the other of said two inputs of said exponentiator, one of said inputs of said switch being connected for initially receiving a primitive element $A_0$ in $GF(2^m)$; and
   (c) a delay circuit having an input and an output, said output of said delay circuit being connected to the other of said switch inputs, said input of said delay circuit being connected to said output of said exponentiator whereby after said exponentiator initially receives said primitive element $A_0$ in $GF(2^m)$ through said switch, said switch is switched to make said exponentiator receive as an input thereto a delayed output $A_{k-1}$ from said exponentiator thereby generating $\{A_k\}$ continuously at said output of said exponentiator.

2. The circuit for generating a sequence of pseudo random numbers, $\{A_k\}$, of claim 1 wherein said exponentiator in $GF(2^m)$ comprises:
   (a) a cyclic-shift circuit;
   (b) a Massey-Omura multiplier; and
   (c) a control logic circuit connected to said cyclic-shift circuit and said Massey-Omura multiplier to perform the function $U_i = \alpha 2^i$ (for $n_i = 1$) or 1 (for $n_i = 0$), where i is an integer greater than zero.

3. A method of generating a sequence of pseudo random numbers, $\{A_k\}$, comprising the steps of:
   (a) providing an exponentiator in $GF(2^m)$ for the normal basis representation of elements in a finite field $GF(2^m)$ each represented by m binary digits and having two inputs and an output from which the sequence $\{A_k\}$ of pseudo random numbers is taken;
   (b) connecting one of the two inputs to receive the outputs $\{E_k\}$ of a maximal length shift register of n stages;
   (c) providing a switch having a pair of inputs and an output;
   (d) connecting the output of the switch to the other of the two inputs of the exponentiator;
   (e) connecting one of the inputs of the switch to a source of a primitive element $A_0$ in $GF(2^m)$;
   (f) providing a delay circuit having an input and an output;
   (g) connecting the output of the delay circuit to the other of the switch inputs;
   (h) connecting the input of the delay circuit to the output of the exponentiator;
   (i) initially positioning the switch to receive the primitive element $A_0$ in $GF(2^m)$; and
   (j) thereafter positioning the switch to make the exponentiator receive as an input thereto a delayed output $A_{k-1}$ from the exponentiator thereby generating $\{A_k\}$ continuously at the output of the exponentiator.

4. The method for generating a sequence of pseudo random numbers, $\{A_k\}$, of claim 3 wherein:
the exponentiator in $GF(2^m)$ performs the function $U_i = \alpha 2^i$ (for $n_i=1$) or 1 (for $n_i=0$), where i is an integer greater than zero.

5. The method for generating a sequence of pseudo random numbers, $\{A_k\}$, of claim 4 and additionally including the recursive steps of:

(a) letting $A = \alpha$(a point in the finite field $GF(2^m)$);
(b) if $n_0=1$, letting $B=A$ otherwise, letting $B=1$;
(c) letting $C=1$ and $k=0$;
(d) multiplying B and C to obtain $Z=BC$;
(e) setting $k=k+1$;
(f) replacing A with the cyclic shift (CS) of A;
(g) if $k=m$, $Z=\alpha^N$, (where $1 \leq N \leq 2^m-1$) stopping;
(h) if $k<m$, setting $C=Z$; and, setting $B=A$ if $n_k=1$, otherwise setting $B=1$;
(i) going back to step (d).

* * * * *